(12) United States Patent
Ivanov et al.

(10) Patent No.: US 9,557,181 B2
(45) Date of Patent: Jan. 31, 2017

(54) SYSTEM FOR DETERMINING HEIGHT INFORMATION

(75) Inventors: Vladimir Ivanov, Munich (DE); Martin Fischer, Munich (DE); Carsten-Christian Spindler, Munich (DE); Simon Schütz, Stuttgart (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 818 days.

(21) Appl. No.: 13/458,378

(22) Filed: Apr. 27, 2012

(65) Prior Publication Data

US 2012/0274632 A1    Nov. 1, 2012

(30) Foreign Application Priority Data

Apr. 29, 2011 (EP) ..................... 11164312

(51) Int. Cl.
*G06T 15/00* (2011.01)
*G01C 21/32* (2006.01)

(52) U.S. Cl.
CPC ............. *G01C 21/32* (2013.01); *G06T 15/00* (2013.01)

(58) Field of Classification Search
CPC .......... G06T 19/00; G06T 17/20; G06T 17/00; G01C 21/31; G01C 21/32; G06F 17/30
See application file for complete search history.

(56) References Cited

U.S. PATENT DOCUMENTS

| | | | |
|---|---|---|---|
| 4,179,693 A * | 12/1979 | Evans .................. | G01S 7/04 342/64 |
| 5,781,146 A * | 7/1998 | Frederick ............... | G01S 7/22 342/179 |
| 6,239,808 B1 * | 5/2001 | Kirk et al. ............... | 345/582 |
| 6,577,714 B1 * | 6/2003 | Darcie et al. ............ | 379/93.17 |
| 8,788,128 B1 * | 7/2014 | McCusker ............ | G08G 5/025 342/120 |
| 8,884,955 B1 * | 11/2014 | Hsu ........................... | 345/421 |
| 2002/0038178 A1 * | 3/2002 | Talkenberg et al. ....... | 701/200 |
| 2003/0142523 A1 | 7/2003 | Biacs | |
| 2003/0200223 A1 * | 10/2003 | Hack ........................ | 707/101 |
| 2005/0017447 A1 * | 1/2005 | Geshwind ................ | 273/236 |
| 2005/0064567 A1 | 3/2005 | Lay et al. | |
| 2005/0091588 A1 * | 4/2005 | Ramarao et al. ............ | 715/522 |
| 2005/0264576 A1 * | 12/2005 | Sommers ............... | G06T 17/00 345/543 |
| 2006/0031006 A1 * | 2/2006 | Stenbock et al. ........... | 701/200 |
| 2006/0109267 A1 | 5/2006 | Rybacki | |
| 2007/0206016 A1 * | 9/2007 | Szymanski et al. .......... | 345/473 |
| 2010/0194606 A1 | 8/2010 | Otte | |

FOREIGN PATENT DOCUMENTS

| | | |
|---|---|---|
| CN | 101105807 A | 1/2008 |
| CN | 101226544 A | 7/2008 |
| EP | 1 435 507 A2 | 7/2004 |

\* cited by examiner

Primary Examiner — James A Thompson
Assistant Examiner — Tapas Mazumder (57) ABSTRACT

A vehicle navigation system has a processing device. The processing device receives entries in a first data structure that are generated and are respectively associated with one tile of a tiling. The processing device may compare a three-dimensional terrain on the respective tile with at least one pre-defined tile pattern. Either an identifier for a pre-defined tile pattern or data describing the terrain on the respective tile may be stored by the processing device in the entry.

28 Claims, 4 Drawing Sheets

SYSTEM FOR DETERMINING HEIGHT INFORMATION

PRIORITY CLAIM

This application claims the benefit of priority from European Patent Application EP 11 164 312.8, filed Apr. 29, 2011, which is incorporated by reference

BACKGROUND OF THE INVENTION

1. Technical Field

This disclosure generally relates to methods and system associated with the use of height information in navigation systems. Examples disclosed relate in particular to a method of generating a database for a navigation system, to a navigation system and to a method of determining height information for a terrain. Such methods and devices may be used for outputting three-dimensional representations of a terrain.

2. Related Art

Height information for a terrain is increasingly widely used in navigation systems. One exemplary field in which such height information may be used is the outputting of three-dimensional maps. Optical output devices may be used for outputting electronic maps. Since electronic maps may be displayed on screens of small and/or portable devices, they have the advantage of being versatile and compact. Three-dimensional (3D) maps, i.e. perspective representations, may be of particular value to the user owing to their high recognition quality, such as the recognition of an environmental region, such as a street intersection, may be facilitated when a three-dimensional map is output, as compared to a conventional two-dimensional representation.

Another exemplary field in which height information may be used includes navigation applications or driver assistance. For illustration, various cost functions used in route search, such as fuel consumption costs, may depend on the height difference which is to be covered. Height information allows the height differences covered upon traversal of a route to be determined. The influence of an elevation difference on fuel consumption, or on other driver assistance functions, may be taken into account.

SUMMARY

In order to utilize such height information, information on a surface geometry must be stored in the navigation system. Various constraints need to be taken into account. On the one hand, storage space requirements should be kept moderate. On the other hand, the data representing the three-dimensional terrain should have a format which allows perspective views to be generated, with computational resources and times readily available in a navigation system. To this end, the surface structure may be stored as digital elevation model (DEM) data. The DEM data may include triangular patches which respectively are triangulated irregular networks (TINs). This allows a representation of the terrain to be efficiently generated at run time using the DEM data.

Various techniques for high performance visualization of a terrain require that the DEM data seamlessly cover an extended area, i.e. there should be no holes or gaps in which no DEM data are available. In conventional approaches, this requirement may lead to significant amounts of storage space being used for areas which do not have any height variations. This applies in particular where a tiling is used for enhancing performance at run time.

Accordingly, there is a need for methods and navigation systems which allow storage space requirements for DEM data to be reduced. There is in particular a need for such methods and devices which use a tiling for organizing data, and which allow storage space requirement for DEM data to be reduced.

In one example, a method of generating a database for a navigation system is provided. Data defining a three-dimensional terrain are retrieved. Based on the retrieved data, a first data structure may be generated using a tiling which includes a plurality of tiles. For each tile of the tiling, an entry may be respectively generated in the first data structure. In order to generate the entry for a tile, a portion of the three-dimensional terrain contained in the respective tile may be compared to at least one pre-defined tile pattern included in a second data structure. Based on a result of the comparison, one of data defining the portion of the three-dimensional terrain or an identifier for a pre-defined tile pattern included in the second data structure may be selected for storing in the entry. The first data structure and the second data structure are stored in the database.

In the method, it is not always required to store in the database a complete set of DEM data which defines the portion of the three-dimensional terrain in the respective tile. If the comparison of the terrain for a tile to the pre-defined tile pattern or to the pre-defined tile patterns shows that there is agreement in at least lateral positions of vertices relative to each other, it may be sufficient to store a pointer to the respective pre-defined tile pattern, rather than full information including coordinate 3-tuples of all vertices. This allows storage space to be saved for tile patterns which occur frequently. For illustration, tiles in which the terrain does not exhibit any significant height variation may be represented by a pointer to a tile pattern which defines a flat terrain. While a tiling may be still used for organizing the data, thus preserving the associated performance benefits, storage space requirements may be reduced. The pre-defined tile pattern which may be found in plural different tiles, such as a flat terrain or a terrain having only a small number of planar facets, has to be stored only once.

The "data defining the portion of the three-dimensional terrain" which are stored in the entry are data which, by themselves, provide a full description of the three-dimensional surface, without requiring information from the second data structure to be combined therewith.

Coordinates of vertices of a surface mesh defining the three-dimensional terrain may be retrieved from the data defining the three-dimensional terrain or may be generated based on the data defining the three-dimensional terrain. Each one of the vertices respectively has a pair of lateral coordinates and a height coordinate, so that three-dimensional information may be available. For each tile of the tiling, the entry in the first data structure may respectively be generated such that it includes an identifier for a pre-defined tile pattern if lateral coordinates of all vertices of the surface mesh which are located on the tile correspond to lateral coordinates of vertices in the respective pre-defined tile pattern. If there are plural pre-defined tile patterns, the identifier may be stored for the one pre-defined tile pattern for which the lateral coordinates of the vertices of the surface mesh correspond to the coordinates of the pre-defined tile pattern. As used herein, lateral coordinates are coordinates in the two directions orthogonal to the gravity vector. As used herein, the relative lateral coordinates of vertices on the tile "correspond to" the lateral coordinates of the vertices in a pre-defined tile pattern if the relative positions, i.e., the x- and y-coordinates of the distance vectors between all pairs of vertices, are identical for both the surface mesh on the tile and the pre-defined tile pattern.

Thus, an identifier for a pre-defined tile pattern may be stored to describe the topology for the respective tile. A match between the topology of the surface mesh (i.e., its projection into the x-y-plane) and a pre-defined tile pattern allows the storage space to be reduced by storing an identifier to the pre-defined tile pattern which includes the topology information. This allows such identifiers to be used for a greater number of tiles.

For a tile of the tiling, a decision on whether data defining the portion of the three-dimensional terrain or an identifier for a pre-defined tile pattern may be to be stored may be made based on the topology of the surface mesh. The topology may be defined by the lateral coordinates of vertices of the surface mesh in the respective tile. The topology may be the projection of the surface mesh into the x-y-plane. The decision on whether data defining the portion of the three-dimensional terrain or an identifier for a pre-defined tile pattern may be stored may be made based on whether the topology of the surface mesh in the tile matches the pre-defined tile pattern. This allow the information on the surface mesh to be stored in an efficient and compact way even when tiles having the same topology are offset from each other in the height direction.

If the lateral coordinates of all vertices of the surface mesh which are located on the tile do not correspond to lateral coordinates of vertices in any one of the pre-defined tile pattern(s), data defining the portion of the three-dimensional terrain on the respective tile may be stored in the entry of the first data structure. This data may include full DEM data for the respective tile. This data may include one or plural triangulated irregular networks (TINs). The data may include two TINs for defining the surface mesh for the tile for a coarse resolution level, and four additional TINs for defining the surface mesh for the tile for a finer resolution level. This allows a square tile to be subdivided into two triangles (coarse resolution level) or four triangles (finer resolution level), with a TIN being defined for each one of the triangles.

Based on height coordinates of the vertices located on the tile, it may be determined whether a height coordinate of at least one vertex located on the tile may be stored in the first data structure in addition to the identifier for the pre-defined tile pattern. This allows the height coordinate to be selectively stored only when required, leading to a further reduction in storage space requirements.

Height coordinates of all vertices located on the tile may be stored in the entry in the first data structure if height coordinates of any pair of the vertices located on the tile differ from each other by more than a pre-determined threshold. The threshold may be set equal to zero i.e. the height coordinates of all vertices may be stored in the entry of the first data structure which corresponds to the tile, unless all vertices located on the tile have identical height. Thereby, a faithful representation of elevation data may be obtained.

At most one height shift value may be stored in the entry in the first data structure if height coordinates of all vertices located on the tile differ from each other by at most a pre-determined threshold. The threshold may be set equal to zero i.e. at most one height shift value may be stored for a tile if all vertices located on the tile have identical height. Thereby, storage space requirements may be further reduced.

One height shift value may be stored in the entry in the first data structure if the height coordinates of all vertices are different from a default height value. No height shift value may be stored in the entry in the first data structure if the height coordinates of all vertices located on the tile are all equal to the default height value. The default height value may be zero elevation. Thereby, no height coordinate at all needs to be stored for a tile representing flat terrain at sea level. One height shift value, in combination with the identifier for the appropriate tile pattern, is sufficient to describe a tile representing flat terrain offset from sea level.

The entry in the first data structure may respectively be generated such that it includes a unique tile identifier for the respective tile. The unique tile identifier may be such that, using the tile identifier, the coordinates of a characteristic point of the tile, such as its center or a corner, may be determined.

The identifier for a pre-defined tile pattern may be selected for storing in the first data structure if all vertices located on the tile are located on a boundary, in particular on corners, of the tile. Thereby, at least tiles which represent flat terrain may be represented using an identifier for a pre-defined tile pattern.

Each pre-defined tile pattern included in the second data structure may have a data format defined to correspond to the data format used for describing tiles in the first data structure when it is not possible to refer to a tile pattern. For illustration, each pre-defined tile pattern may respectively include lateral coordinates of a plurality of vertices and an array of indices describing triangular faces, with each of the triangular faces respectively having three of the vertices as corners. The array of indices describing the faces may include pointers to entries in the array of vertices.

The pre-defined tile patterns in the second data structure may be user-defined. For illustration, only one pre-defined tile pattern which has vertices only on the corners of the tile may be pre-defined. Alternatively, one or several pre-defined tile patterns may be automatically generated by analyzing the surface mesh for plural different tiles. If a given topology of vertices occurs more than a pre-determined number of times, a corresponding tile pattern may be automatically defined and stored in the second data structure.

According to another example, a database may be provided which represent a three-dimensional terrain. The database includes a first data structure having a plurality of entries, each one of the entries including a unique tile identifier for a tile of a tiling, and a second data structure defining at least one pre-defined tile pattern. Each one of the entries in the first data structure includes one of a pointer to a pre-defined tile pattern in the second data structure or data which directly describe the terrain in the respective tile. The data which directly describe the terrain may include an array of 3-tuples of vertex coordinates for plural vertices. The data which directly describe the terrain may further include an array of vertex indices defining plural triangular facets for the respective tile.

Each entry in the first data structure of the database may be associated with respectively one tile. Each entry in the first data structure which includes a pointer to a pre-defined tile pattern may selectively include no height coordinate, one height coordinate or more than one height coordinate. The respective entry in the first data structure may be such that it does not include any lateral coordinates of vertices of a surface mesh on the respective tile.

According to another aspect, a navigation system may be provided. The navigation system has a database which represents a three-dimensional terrain and includes a first data structure and a second data structure. The first data structure has a plurality of entries, each one of the entries including a unique tile identifier for a tile of a tiling. The second data structure defines at least one pre-defined tile pattern. The navigation system has a processing device coupled to the database. The processing device may be configured to access an entry of the first data structure using the unique identifier for a tile and to determine whether the accessed entry includes a pattern identifier for a pre-defined tile pattern stored in the second data structure. The processing device may be configured to then selectively retrieve information on the pre-defined tile pattern from the second data structure if the entry includes the pattern identifier. The processing device may be configured to determine a height coordinate of one or plural locations based on the accessed entry of the first data structure and, if the entry includes the pattern identifier, based on the pre-defined tile pattern included in the second data structure.

In this navigation system, an entry for a tile in the first data structure may selectively include one of a pointer to a tile pattern or data which directly describe the DEM on the respective tile. It is not required to store the full DEM data for each tile. For illustration, tiles which do not include any vertices of the surface mesh in their interior may respectively have an entry in the first data structure which includes a pointer to the second data structure. Storage space requirements may thereby be reduced.

The navigation system may include an optical output device. The processing device may be configured to control the optical output device to display a portion of a DEM which may be located on a given tile. The processing device may control the optical output device using both data included in the entry in the first data structure for the respective tile and the definition of the tile pattern to which this entry points, if the entry in the first data structure includes an identifier for a pre-defined tile pattern. The processing device may control the optical output device using only data included in the entry in the first data structure if the entry does not include an identifier for a pre-defined tile pattern.

Each entry in the first data structure which includes a pointer to a pre-defined tile pattern may selectively include no height coordinate, one height coordinate, or more than one height coordinate. The processing device may be configured such that, if the entry includes a pattern identifier, it respectively determines a pair of lateral coordinates for plural vertices of a surface mesh based on the retrieved information on the pre-defined tile pattern, and that it determines a height coordinate of the vertices based on the entry of the first data structure. Thereby, the pre-defined tile pattern may be used to determine the vertex topology, while height information may be retrieved from the corresponding entry in the first data structure. Versatility may be thereby enhanced.

The processing device may be configured to set height coordinates of the vertices of the surface mesh to the same value if the entry of the first data structure includes the pattern identifier and at most one height coordinate. Thus, for a flat tile, at most one height coordinate has to be stored in the entry in the first data structure.

The processing device may be configured to determine different height coordinates for the vertices if the entry of the first data structure includes the pattern identifier and a plurality of height coordinates. Entries of the database which do not include an identifier for a pre-defined tile pattern may respectively include information on coordinate 3-tuples of vertices of a surface mesh. Such entries may further include an array of vertex indices which defines the triangular facets of the surface mesh. The database may be a database generated using a method of generating a database of any one example.

According to another example, a method of determining height information in a navigation system is provided. The navigation system has a database which includes a first data structure having a plurality of entries, each one of the entries including a unique tile identifier for a tile of a tiling, and a second data structure defining at least one pre-defined tile pattern. In order to determine height information for one or more locations, an entry of the first data structure may be accessed using the unique identifier for a tile. It may be determined whether the entry includes a pattern identifier for a pre-defined tile pattern stored in the second data structure. If the entry includes the pattern identifier, information on the pre-defined tile pattern may be retrieved from the second data structure. Height coordinate(s) of one or plural locations may be determined based on the accessed entry of the first data structure and, if the entry includes the pattern identifier, based on the pre-defined tile pattern included in the second data structure.

In the method, pre-defined tile pattern(s) in the second data structure may be referenced by an entry for a tile in the first data structure. It is not required to store the full DEM data separately for each tile which includes an identifier for a pre-defined tile pattern.

For illustration, tiles which do not include any vertices of the surface mesh in their interior may respectively have an entry in the first data structure which includes a pointer to the second data structure. Storage space requirements may thereby be reduced.

The pre-defined tile pattern in the second data structure may define a topology of vertices of a surface mesh, i.e. the pre-defined tile pattern may include information on the relative lateral coordinates of vertices on the respective tile. If required, information on height coordinates of the vertices may be stored separately in each entry in the first data structure. For illustration, if the terrain in a tile is flat, but offset from a default height (such as sea level), one height coordinate may be stored in the respective entry in the first data structure for the respective tile. If the tile does not include any vertices in its interior, but the vertices at the corners are at different heights, four height coordinates may be stored in the respective entry in the first data structure. The determined height coordinate(s) of one or more locations may be used for various purposes, such as visualization of three-dimensional terrain, computation of costs incurred upon traversal of a route, route search, or similar.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different examples.

DETAILED DESCRIPTION OF EMBODIMENTS

Figure 1:
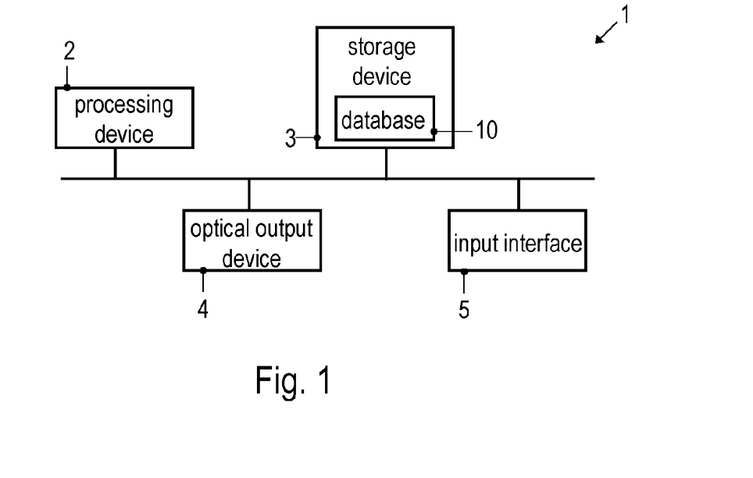
FIG. 1 is a schematic block diagram of a navigation system.

FIG. 1 schematically illustrates a navigation system 1 according to an example. The navigation system 1 comprises a processing device 2 controlling the operation of the navigation system 1. The processing device 2 may comprise a central processing unit, for example in form of one or more microprocessors, digital signal processors or application-specific integrated circuits. The processing device 2 may also include a graphics processor. The navigation system 1 further includes a database 10 stored in a storage device 3. The storage device 3 may comprise any one, or any combination, of various types of memory, such as random access memory, flash memory or a hard drive, but also removable memories such as a compact disk (CD), a DVD, a memory card or the like. The navigation system 1 also includes an optical output device 4. The navigation system 1 may include additional components, such as a position sensor and/or a wireless receiver and/or an input interface 5.

The storage device 3 stores a database 10 which defines a three-dimensional terrain. The data in the database 10 may be used by the processing device 2 to generate three-dimensional maps, i.e., to visualize the terrain, to determine fuel consumption or other costs associated with routes, or similar.

As will be explained in more detail in the following, the data in the database 10 may be organized in accordance with a tiling. The database 10 includes a first data structure and a second data structure. The first data structure has a plurality of entries, each associated with one tile of the tiling. Each entry in the first data structure has a unique tile identifier. In addition, each entry in the first data structure either includes data which directly define the digital elevation model (DEM) in the respective tile or an identifier for a pre-defined tile pattern. If such an identifier for a pre-defined tile pattern is included, the information in the entry of the first data structure in isolation does not allow the surface to be reconstructed for the tile, unless combined with information in the second data structure. The second data structure includes information on the pre-defined tile pattern (s) which are referenced by entries in the first data structure.

If an entry in the first data structure includes data which directly describes the DEM in the respective tile, the entry may include an array of coordinate 3-tuples of vertices. The entry may further include another array of indices for vertices, which defines triangular facets of a triangulated irregular network (TIN). More than one TIN may be defined for a tile. For illustration, two TINS may be used to define the terrain in a tile on a coarser resolution, and four TINS may be used to define the terrain in the tile on a finer resolution. All of this data may be included in the first data structure if it is not possible to define the topology of the surface mesh in the tile by referring to a pre-defined tile pattern.

If an entry in the first data structure includes an identifier for a pre-defined tile pattern, it does not include any information on the topology of the surface mesh in the respective tile, i.e. the lateral position of one characteristic point of the tile (such as the center or a given corner) can be derived from the unique tile identifier. The lateral positions of vertices of the surface mesh may then be derived using the pre-defined tile pattern to which reference is made in the entry.

If an entry in the first data structure includes an identifier for a pre-defined tile pattern, it may nevertheless include one or plural height coordinates. The height coordinate(s) included in the first entry may be combined with the topology of the surface mesh defined by the pre-defined tile pattern which may be referenced by the entry in the first data structure, in order to determine coordinate 3-tuples of all vertices located on the tile.

The number and types of pre-defined tile patterns may be selected as appropriate for the contemplated application. In some implementations, only one pre-defined tile pattern may be used which represents a tile which has vertices of the surface mesh at its corners, but which does not have vertices in the interior. Such a pre-defined tile pattern describes the topology of the surface mesh on flat terrain. Such a pre-defined tile pattern also describes the topology of the surface mesh for many tiles at coarser resolution levels. For illustration, many navigation system databases use a large number of resolution levels, such as ten or more resolution levels. At least in the coarsest level(s), the resolution may be such that the terrain may be appropriately defined by vertices located on tile corners only. While implementations using one pre-defined tile pattern will be illustrated in the following, a greater number of pre-defined tile patterns may be used in other implementations.

Figure 2:
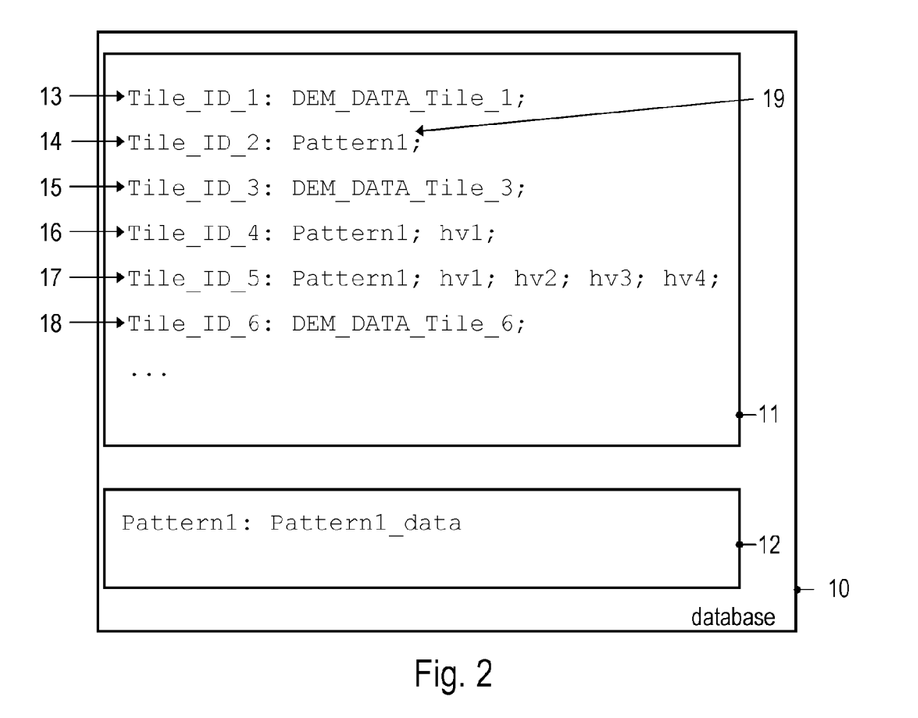
FIG. 2 is a schematic representation of a database.

FIG. 2 is a schematic view of a database 10. The database 10 may be used in the navigation system 1. The database 10 represents a three-dimensional terrain. If it is desired to provide plural different resolution levels, data structures as explained in the following may be provided for each one of the resolution levels. Alternatively, separate first data structures 11 may be provided for plural different resolution levels, while one second data structure 12 may be used for plural different resolution levels.

The database 10 has a first data structure 11 and a second data structure 12. In the first data structure 11, a plurality of entries 13-18 are stored. Each one of the entries 13-18 may be respectively associated with one tile of a tiling. The second data structure 12 includes data defining a pre-defined tile pattern. The data in the second data structure 12 may have a data format which corresponds to that used for DEM data in entries of the first data structure, but with height information omitted.

Each one of the entries 13-18 includes a unique tile identifier. The unique tile identifier, indicated as Tile_ID_1, Tile_ID_2 etc. is such that it allows the x- and y-coordinates of one characteristic point of the tile (e.g., the center or a corner) to be determined.

A subset of entries 13, 15 and 18 in the first data structure respectively includes data which directly define the portion of the DEM on the respective tile. Various data formats may be used. In implementations, the DEM data in entries 13, 15 and 18 may respectively define one or plural TINS. For each TIN, the DEM data may include an array of 3-tuples of vertex coordinates and an array of vertex indices which defines which vertices of the vertex array respectively form a triangular facet of a surface mesh. The DEM data may include additional information, such as an array of normal vectors for the triangular facets.

In order to determine the height of one or more locations on one of the tiles represented by entries 13, 15 or 18, the respective entry 13, 15 or 18 is accessed. The height of the one or more locations may be determined from the DEM data and independently of the second data structure 12.

Another subset of entries 14, 16 and 17 in the first data structure respectively includes an identifier 19, indicated as "Pattern1", for a pre-defined tile pattern stored in the second data structure 12. These entries 14, 16 and 17 do not include 3-tuples of vertex coordinates for the various vertices of the DEM. The entries 14, 16 and 17 do not include information on the topology of the surface mesh within the respective tiles, i.e. no information on the x- and y-coordinates of vertices of the surface mesh relative to each other needs to be stored in the entries 14, 16 and 17.

Some of the entries which include an identifier 19 for a pre-defined tile pattern, such as entry 14, may not include any height coordinate. This indicates that all vertices of the surface mesh defined by the respective pre-defined tile pattern are located at a default height. The default height may be sea level. Some of the entries which include an identifier 19 for a pre-defined tile pattern, such as entry 16, may include only one height coordinate. This indicates that all vertices of the surface mesh defined by the respective pre-defined tile pattern are located at the same height which may be offset from the default height. Thereby, flat terrain offset from the default height may be represented using one single height shift value only.

Some of the entries which include an identifier 19 for a pre-defined tile pattern, such as entry 17, may include more than one height coordinate. One height coordinate for each vertex of the respective pre-defined tile pattern may be stored in the associated entry 17. Such a data structure may be used when the vertices of the surface mesh defined by the respective pre-defined tile pattern are not all located at the same height on the respective tile. Thereby, non-flat terrain may be represented, provided the topology (i.e., relative x- and y-locations) of the vertices match one of the pre-defined tile patterns.

The second data structure 12 includes information on the pre-defined tile pattern. This information may be generally similar to the format in which DEM data are stored for entries 13, 15 and 18 in the first data structure. However, if the pre-defined tile pattern only includes information on the topology of the surface mesh, height information may be absent from the second data structure 12. For illustration, the second data structure 12 may include an array defining 2-tuples of lateral vertex coordinates for each pre-defined tile pattern. The lateral vertex coordinates are measured relative to the pre-defined location of the tile, such as tile center or one of the corners. The second data structure 12 may further include an array of vertex indices defining which vertices form the triangular facets of a TIN. If the tile pattern corresponds to a pattern which only has vertices at the corners of the tile, the index array of vertex indices may define two triangular facets which, in combination, cover the whole tile.

In order to determine the height of one or more locations on one of the tiles represented by entries 14, 16 or 17, the respective entry 14, 16 or 17 is accessed. Using the identifier 19 for the pre-defined tile pattern, the corresponding data defining the tile pattern may be retrieved from the second data structure 12. Using the unique tile identifier, the absolute x- and y-position of a characteristic point of the tile may be determined. Using the information on relative lateral positions of vertices included in the second data structure for the referenced tile pattern, the x- and y-coordinates of all vertices of the surface mesh on the respective tile may be determined. Based on whether or not the corresponding entry in the first data structure has one or more height coordinates, the height coordinates of the vertices may be determined. For illustration, if the entry in the first data structure does not have a height coordinate, the z-values for all vertices are set to default height (e.g., sea level). If the entry in the first data structure has one height coordinate, the z-values for all vertices are set to this value. If the entry in the first data structure has one height coordinate, the z-values for the various vertices are set to the various values included in the respective entry 17. The sequence of height values in the entry 17 in the first data structure 11 may in this case correspond to the sequence in which vertices are listed in the vertex array in the second data structure 12.

The height information thus determined, either using the DEM data of the entry in the first data structure 11 or using the entry in the first data structure 11 in combination with the second data structure 12, may be used for various purposes. For illustration, a three-dimensional visualization of the terrain may be generated. Costs, such as fuel consumption, associated with different routes may be computed, taking into account differences in elevation.

Figure 3:
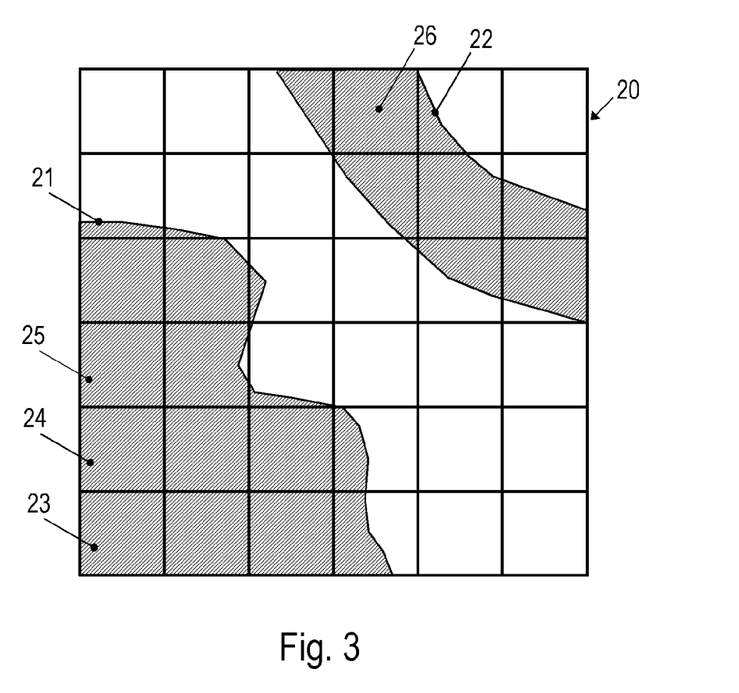
FIG. 3 is a plan view of a terrain with a superimposed tiling.

FIG. 3 is a plan view of a terrain. A tiling 20 may be superimposed onto the terrain. The terrain includes regions which are flat, such as a lake or sea 21. The terrain may include additional regions which are flat, such as a river 22. In a conventional approach for storing DEM data, the surface mesh for each tile would be stored. This would require coordinate 3-tuples to be stored for vertices on corners of tiles even when the tile may be flat and may be completely covered by sea 21 or river 22.

By using pre-defined tile pattern(s), the storage space may be reduced. Using a pre-defined tile pattern which does not have vertices in the interior of the tile, the topology of terrain which may be flat within a tile may be defined by reference to the tile pattern. In the terrain shown in FIG. 3, data entries generated for tiles 23-25 in the first data structure may include an identifier for the pre-defined tile pattern which has vertices at its corners only. With the tiles 23-25 being located at sea level, it may be not required to store any height coordinates in the respective entry of the first data structure.

Similarly, a data entry for a tile 26 generated in the first data structure may include an identifier for the pre-defined tile pattern which has vertices at its corners only. If the tile 26 is located above or below sea level, one single height coordinate may be stored in the respective entry of the first data structure. The technique of using one or more pre-defined tile pattern(s) may be used both when generating the database and when reconstructing terrain from the database.

Figure 4:
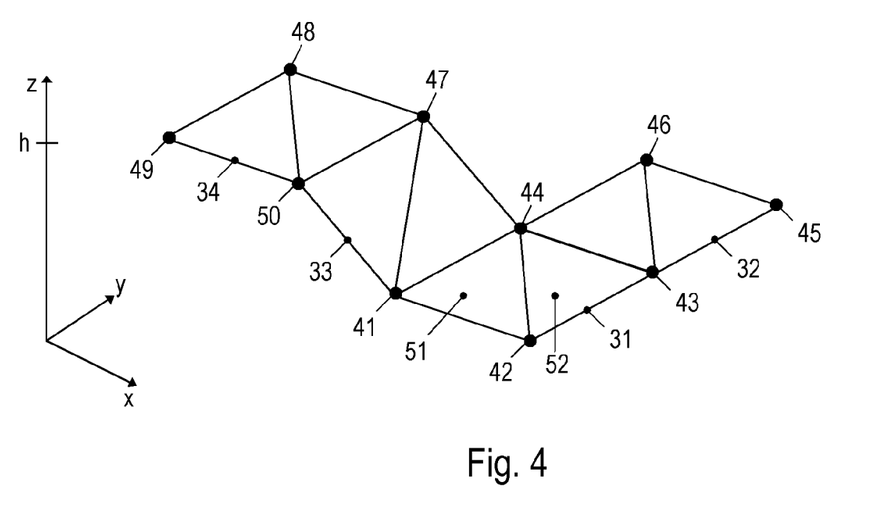
FIG. 4 is a perspective view illustrating the reconstruction of a three-dimensional terrain using the database.

FIG. 4 is a schematic perspective view for illustrating the reconstruction of terrain from the database, when the database is configured as described with reference to FIGS. 1 and 2. Illustrated is the surface mesh for plural tiles 31-34. The entries for each one of tiles 31-34 in the first data structure of the database may include a pointer to the tile pattern which has vertices only at the corners of the tile.

The absolute x- and y-coordinates of vertices 41-44 located on tile 31 may be determined by combining the position of a characteristic point of the tile 31, such as the centre, which is derivable from the unique tile identifier with the relative positions of vertices stored in the second data structure. The z-coordinate of vertices 41-44 can again be determined based on the entry for tile 31 in the first data structure. If the entry does not have any z-coordinate, the elevation of all vertices 41-44 is set to default height. The default height may be sea level.

Similarly, the entry for tile 32 in the first data structure may not include any z-coordinate value. Correspondingly the elevation of vertices 43-46 at the corners of tile 32 is set to default height, e.g. sea level. The entry for tile 33 in the first data structure may include four z-coordinates. The x- and y-coordinates of vertices 41, 44, 47 and 50 located on tile 33 may be determined by combining the position of a characteristic point of the tile 33, such as the center, which may be derivable from the unique tile identifier with the relative positions of vertices stored in the second data structure for the respective tile pattern. The z-coordinates of vertices 41, 44, 47 and 50 are set to the values given in the entry for tile 33 in the first data structure. Thereby, a portion of a surface mesh which is not parallel to ground plane, but which does not have any vertices in the interior of the tile may also be represented. The entry for tile 34 in the first data structure may include only one z-coordinate value. Correspondingly the elevation of all vertices 47-50 at the corners of tile 34 is set to the z-coordinate value stored in the entry for tile 34 in the first data structure.

For tiles in which the arrangement of vertices relative to each other has a topology which corresponds to a pre-defined tile pattern, the surface mesh on the respective tile may thus be reconstructed by combining the topology defined by the pre-defined tile pattern with the height coordinates stored in the entry of the first data structure, if any. Vice versa, starting from a surface mesh in the form of a TIN or several TINs as illustrated in FIG. 4, entries in the first data structure may be generated. The topology of the vertices of the surface mesh on the respective tile may respectively be compared to the pre-defined tile pattern(s).

The definition of the pre-defined tile pattern in the second data structure may include an index array defining triangular facets, such as facets 51 and 52. Using the data from the second data structure, a representation of the surface mesh on the various tiles may be obtained which corresponds to the data available for tiles for which the DEM data may be directly stored in the first data structure.

Figure 5:
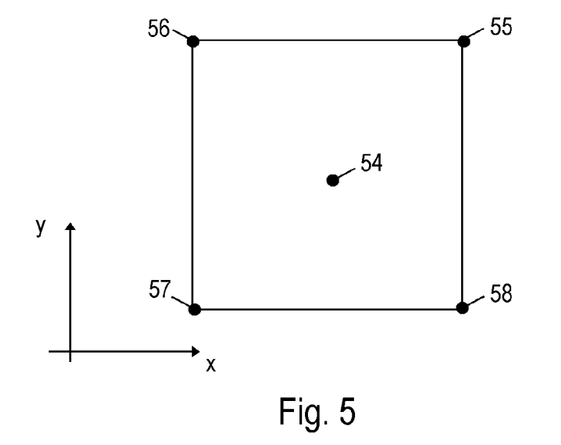
FIG. 5 is a plan view showing vertices of a tile.

FIG. 5 illustrates, in plan view, a tile having a center 54 and vertices 55-58 at its corners. The first data structure 11 may be such that the location of the center 54, or of another characteristic point of the tile, is derivable from the unique tile identifier. The second data structure includes lateral coordinates of the vertices 55-58, measured relative to the characteristic point. The absolute lateral (x- and y-) coordinates of the vertices may thus be determined, as described above.

Figure 6:
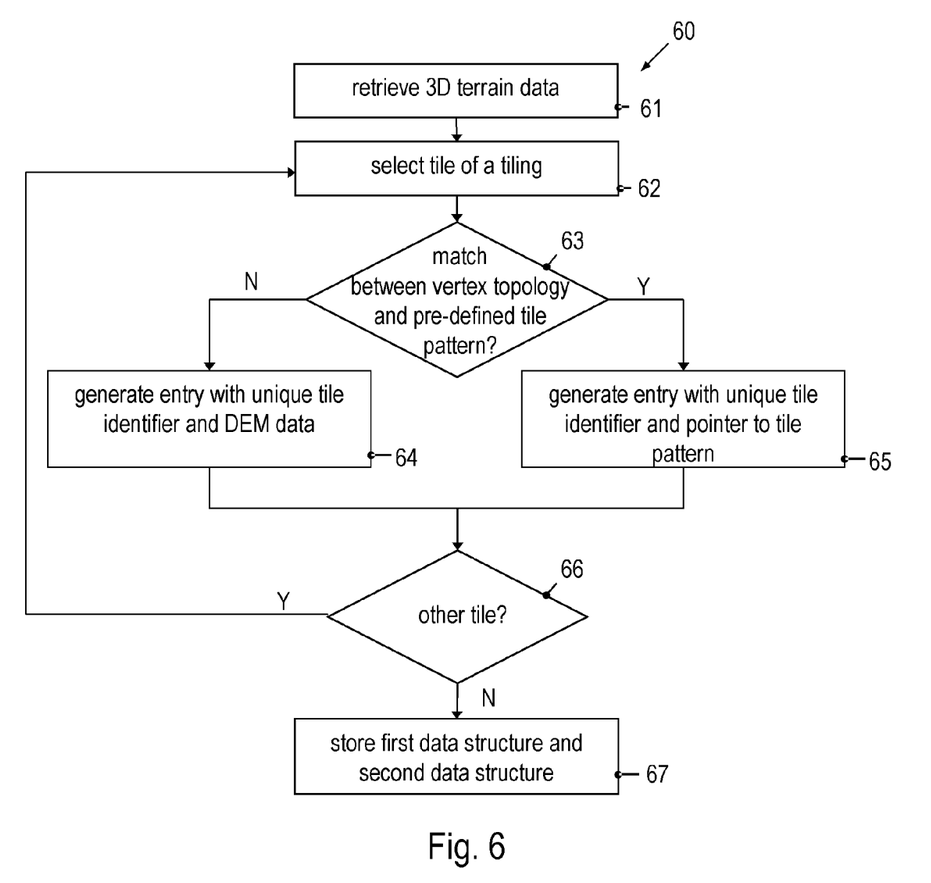
FIG. 6 is a flow chart of a method of generating a database.

FIG. 6 is a flow chart of a method 60 of generating a database. The method 60 may be performed by an electronic processing device, such as a computer. The method 60 may be performed before the database may be deployed to a navigation system.

At 61, data defining a three-dimensional terrain are retrieved. The data may include a surface mesh. The data may define one or plural TIN(s). The TIN(s) may be defined on a tiling. In other implementations, the data may for example be height values in a satellite image which are not yet in the form of a surface mesh. In this case, one or plural TIN(s) may be determined so as to represent the three-dimensional terrain. A corresponding tiling may also be defined.

At 62, a tile of a tiling may be selected. The method 60 may iterate through plural tiles of a tiling. In this case, the tile selected at 62 may be a tile at a corner of the tiling in the first iteration. At 63, the surface mesh of the TIN(s) on the respective tile may be compared to one or plural pre-defined tile patterns. The TIN(s) on the respective tile include plural vertices. In the comparing step, the relative lateral coordinates of the vertices of the TIN(s) on the respective tile may be determined. Subsequently, the relative lateral coordinates of the vertices, which define the topology of the surface mesh on the respective tile, may be compared to the one or plural pre-defined tile patterns. It is determined whether the topology of the vertices of the TIN(s) on the respective tile match one of the pre-defined tile pattern(s).

For illustration, if only one pre-defined tile pattern is used which has vertices only at the corners of the tile, the vertex topology of the TIN(s) on the tile matches the pre-defined tile pattern only if there is no vertex in the interior of the tile, and all vertices are located at the corners of the tile.

If the vertex topology in the tile does not match a pre-defined tile pattern, the method proceeds to 64. At 64, DEM data describing the portion of the TIN(s) on the tile are stored in the entry in a first data structure of the database. The DEM data may include a vertex array having coordinate 3-tuples of vertex coordinates for all vertices and an index array describing which ones of the vertices respectively form the various triangular facets. The entry in the first data structure further includes a unique identifier for the respective tile.

If the vertex topology in the tile matches a pre-defined tile pattern, the method proceeds to 65. At 65, an entry for the respective tile may be generated in the first data structure. The entry includes an identifier which points to the tile pattern which matches the vertex topology of the TIN(s) on the respective tile. The entry does not include lateral coordinates for the various vertices. The entry in the first data structure further includes a unique identifier for the respective tile. Depending on the height coordinates of the vertices on the tile, the entry may be generated such that it includes no height coordinate if all vertices are located at default height. The entry may be generated such that it includes one height coordinate if all vertices are located at the same height which may be different from default height. The entry may be generated such that it includes one height coordinate for each vertex if the vertices are not all located at the same height.

At 66, it may be determined whether an entry has been generated for each tile. If there are further tiles, the method returns to 62. If an entry in the first data structure has respectively been generated for each tile, at 67, the first data structure and the second data structure are stored to thus generate the database.

Figure 7:
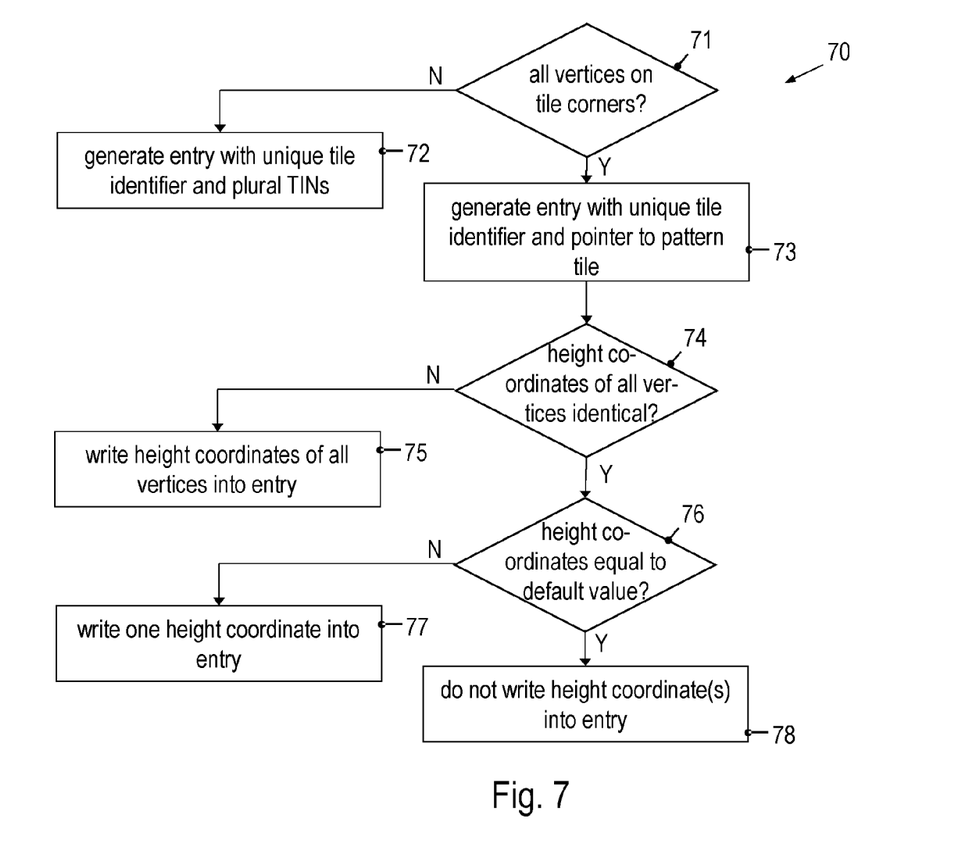
FIG. 7 illustrates a procedure for generating an entry in a database which may be used in the method of FIG. 6.

FIG. 7 is a flow chart of a procedure 70 for further explaining the method of FIG. 6. The procedure of FIG. 7 may be used to implement steps 64-65 in the method of FIG. 6 if there is only one pre-defined tile pattern which has vertices only at the corners of the tile. At 71, it is determined whether all vertices of the surface mesh on the respective tile are located at corners of the tile.

If there is at least one vertex which is not located at a corner of the tile, the method proceeds to 72. At 72, an entry may be generated for the tile which includes a unique tile identifier and data defining one or plural TIN(s). The TIN(s) may include one or plural vertex arrays and an index array which defines the various triangular facets. The method 60 may then continue at 66.

If all vertices are located at corners of the tile, the procedure proceeds to 73. At 73, an entry may be generated for the tile which includes a unique tile identifier and an identifier for the pre-defined tile pattern. At 74, it may be determined whether the height coordinates of all vertices are identical. If the height coordinates of all vertices are not identical, the procedure proceeds to 75. At 75, height coordinates of all vertices located on the tile are stored in the entry in the first data structure.

If the height coordinates of all vertices are identical, the procedure proceeds to 76. At 76, it may be determined whether the height coordinates of all vertices correspond to a default value. The default value may be sea level. If the height coordinates of all vertices located on the tile are not equal to the default value, the procedure proceeds to 77. At 77, one height value which corresponds to the (identical) height coordinate of all vertices may be stored in the entry in the first data structure. The method 60 may then continue at 66.

If the height coordinates of all vertices located on the tile are not equal to the default value, the procedure proceeds to 78. At 78, the entry for the respective tile may be left unmodified, i.e., no height coordinate at all may be written into the entry. The method 60 may then continue at 66. While the use of a tile pattern which has vertices only at the corners of the tile has been illustrated in some embodiments, a greater number of tile patterns may be used. The tile pattern(s) may define various topologies for the vertices of the surface mesh on the respective tile.

Figure 8:
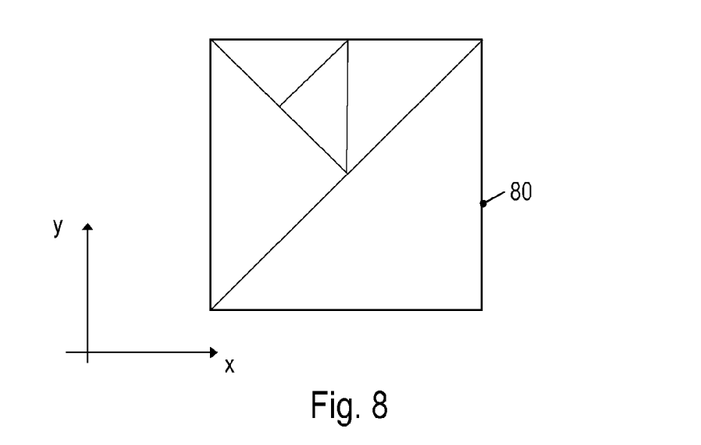
FIG. 8 is a plan view illustrating another exemplary topology of a tile pattern.

FIG. 8 illustrates a tile pattern 80 having another exemplary topology. A wide variety of pre-defined tile patterns may be used. For illustration, as indicated in FIG. 8, the pre-defined tile patterns may have topologies in which a square tile is bi-sected into two triangles. Each one of the resulting triangles may again be bi-sected in a symmetric manner, where required to accommodate elevation changes in the terrain surface. The pre-defined tile patterns may respectively be selected from a set of topologies in which a tile is entirely covered by rectangular isosceles triangles only, which in combination cover the square tile.

While methods and a device according to embodiments have been described in detail, modifications may be implemented in other embodiments. For illustration, while the use of one pre-defined tile pattern has been illustrated in the context of some embodiments, a greater number of pre-defined tile patterns may be used. For further illustration, while pre-defined tile patterns were described which describe the topology of the surface mesh only, it is also possible to use pre-defined tile patterns which include some height information.

Embodiments of the invention may be used for generating databases for use in navigation devices, without being limited thereto. Such databases may be used, for example, for visualizing three-dimensional terrain via an optical output device of a navigation device, for route search or other driver assistance applications, without being limited thereto

We claim:

1. A method of generating a database for a navigation system, the method comprising:
   receiving data defining a three-dimensional terrain;
   generating by a processor based on the data defining the three-dimensional terrain, a first data structure having a tiling which includes a first plurality of tiles, where an entry is generated in the first data structure for each tile of the tiling,
   where generating the entry comprises the steps of:
   comparing by the processor vertices of a surface mesh defining the three-dimensional terrain contained in a first tile of the first plurality of tiles to at least one pre-defined terrain pattern contained in a second data structure, where each pre-defined terrain pattern is stored in the second data structure only once,
   selecting by the processor, based on a result of the comparing, one of data defining the portion of the three-dimensional terrain or an identifier for a pre-defined terrain pattern included in the second data structure for storing in the entry, and
   storing the first data structure and the second data structure in a database.

2. The method of claim 1,
   where coordinates of the vertices of the surface mesh defining the three-dimensional terrain are retrieved from the data defining the three-dimensional terrain or are generated based on the data defining the three-dimensional terrain, each one of the vertices respectively having a pair of lateral coordinates and a height coordinate, and
   where, for each tile of the tiling, the entry is respectively generated to include an identifier for a pre-defined terrain pattern included in the second data structure if relative lateral coordinates of all vertices located on the tile correspond to lateral coordinates of vertices in the pre-defined terrain pattern.

3. The method of claim 2, where the method further comprises the step of:
   determining, based on height coordinates of the vertices located on the tile, whether a height coordinate of at least one vertex located on the tile is to be stored in the first data structure in addition to the identifier for the pre-defined terrain pattern.

4. The method of claim 3, where height coordinates of all vertices located on the tile are stored in the entry in the first data structure if height coordinates of any pair of the vertices located on the tile differ from each other by more than a pre-determined threshold.

5. The method of claim 3, where at most one height shift value for all vertices located on the tile is stored in the entry in the first data structure if height coordinates of all vertices located on the tile differ from each other by at most a pre-determined threshold.

6. The method of claim 5,
   where one height shift value is stored in the entry in the first data structure if the height coordinates of all vertices are different from a default height value, and
   where no height shift value is stored in the entry in the first data structure if the height coordinates of all vertices are equal to the default height value.

7. The method of claim 2, where the one of data defining the portion of the three-dimensional terrain or the identifier is selected independently of height coordinates of all vertices located on the tile.

8. The method of claim 2, where the identifier for a pre-defined terrain pattern is selected for storing in the first data structure if all vertices located on the tile are located on a boundary, in particular on corners, of the tile.

9. The method of claim 1, where each pre-defined terrain pattern included in the second data structure includes lateral coordinates of a plurality of vertices and an array of indices describing triangular faces respectively having three of the vertices as corners.

10. A navigation system comprising:
    a database representing a three-dimensional terrain and including a first data structure having a plurality of entries, each one of the entries including a unique tile identifier for a different tile of a tiling of vertices of a surface mesh defining the three-dimensional terrain, and a second data structure defining at least one pre-defined terrain pattern contained in a second tile, where each pre-defined terrain pattern is stored in the second data structure only once; and a processor coupled to the database, the processor being configured to:

access an entry of the first data structure using the unique tile identifier for a tile;

determine whether the accessed entry includes a pattern identifier for a pre-defined terrain pattern stored in the second data structure;

selectively retrieve information on the pre-defined terrain pattern from the second data structure if the entry includes the pattern identifier; and determine a height coordinate of one or plural locations based on the accessed entry of the first data structure and, if the entry includes the pattern identifier, based on the pre-defined terrain pattern included in the second data structure.

11. The navigation system of claim 10, where the processor is further configured to, if the entry includes a pattern identifier, determine a pair of lateral coordinates of the vertices of the surface mesh based on the retrieved information on the pre-defined terrain pattern and to respectively determine a height coordinate of the vertices based on the entry of the first data structure.

12. The navigation system of claim 11, where the processor is further configured to set height coordinates of the vertices to the same value if the entry of the first data structure includes the pattern identifier and at most one height coordinate.

13. The navigation system of claim 11, where the processor is further configured to determine different height coordinates for the vertices if the entry of the first data structure includes the pattern identifier and a plurality of height coordinates.

14. The navigation system of claim 11, where entries of the database which do not include an identifier for a pre-defined terrain pattern respectively include information on coordinate 3-tuples of vertices of a surface mesh.

15. A method of generating a database for a navigation system, the method comprising:

receiving data defining a three-dimensional terrain;

generating by a processor based on the data defining a three-dimensional terrain, a first data structure having a tiling which includes a first plurality of tiles, where an entry is generated in the first data structure for each tile of the tiling, where generating the entry comprises the steps of:

comparing by the processor vertices of a surface mesh defining the three-dimensional terrain contained in a first tile of the first plurality of tiles to at least one pre-defined terrain pattern contained in a second tile included in a second data structure, where each pre-defined terrain pattern is stored in the second data structure only once, selecting by the processor, based on a result of the comparing, one of data defining the three-dimensional terrain or an identifier for a pre-defined terrain pattern included in the second data structure for storing in the entry, storing the first data structure and the second data structure in the database, where coordinates of the vertices of the surface mesh defining the three-dimensional terrain are retrieved from the data defining the three-dimensional terrain or are generated based on the data defining the three-dimensional terrain, each one of the vertices respectively having a pair of lateral coordinates and a height coordinate, and where, for each tile of the tiling, the entry is respectively generated to include an identifier for a pre-defined terrain pattern included in the second data structure if relative lateral coordinates of all vertices located on the tile correspond to lateral coordinates of vertices in the pre-defined terrain pattern, and where each pre-defined terrain pattern included in the second data structure includes lateral coordinates of a plurality of vertices and an array of indices describing triangular faces respectively having three of the vertices as corners.

16. The method of claim 15, where the method further comprises the step of:

determining, based on height coordinates of the vertices located on the tile, whether a height coordinate of at least one vertex located on the tile is to be stored in the first data structure in addition to the identifier for the pre-defined terrain pattern.

17. The method of claim 16, where height coordinates of all vertices located on the tile are stored in the entry in the first data structure if height coordinates of any pair of the vertices located on the tile differ from each other by more than a pre-determined threshold.

18. The method of claim 16, where at most one height shift value for all vertices located on the tile is stored in the entry in the first data structure if height coordinates of all vertices located on the tile differ from each other by at most a pre-determined threshold.

19. The method of claim 18, where one height shift value is stored in the entry in the first data structure if the height coordinates of all vertices are different from a default height value, and where no height shift value is stored in the entry in the first data structure if the height coordinates of all vertices are equal to the default height value.

20. The method of claim 15, where the one of data defining the portion of the three-dimensional terrain or the identifier is selected independently of height coordinates of all vertices located on the tile.

21. The method of claim 15, where the identifier for a pre-defined terrain pattern is selected for storing in the first data structure if all vertices located on the tile are located on a boundary, in particular on corners, of the tile.

22. A method of determining height information in a navigation device, the navigation device having a database which includes a first data structure having a plurality of entries, each one of the entries including a unique tile identifier for a tile of a tiling, and a second data structure defining at least one pre-defined terrain pattern, where each pre-defined terrain pattern is contained in a different tile and stored in the second data structure only once, the method comprising:

accessing an entry of the first data structure using the unique identifier for a tile;

determining whether the entry includes a pattern identifier for a pre-defined terrain pattern stored in the second data structure;

selectively retrieving, based on a result of the determining, information on the pre-defined terrain pattern from the second data structure if the entry includes the pattern identifier; and determining a height coordinate of one or more vertices of a surface mesh defining a three-dimensional terrain based on the accessed entry of the first data structure and, if the entry includes the pattern identifier, based on the pre-defined terrain pattern included in the second data structure.

23. A non-transitory computer readable storage medium having stored therein instructions executable by a programmed processor for generating a database for a navigation system, the storage medium comprising instructions for:
receiving data defining a three-dimensional terrain;
generating by a processor based on the data defining the three-dimensional terrain, a first data structure having a tiling which includes a first plurality of tiles, where an entry is generated in the first data structure for each tile of the tiling,
where generating the entry comprises the steps of:
comparing by the processor vertices of a surface mesh defining the three-dimensional terrain contained in a first tile of the first plurality of tiles to at least one pre-defined terrain pattern contained in a second tile included in a second data structure, where each pre-defined terrain pattern is stored in the second data structure only once,
selecting by the processor, based on a result of the comparing, one of data defining the portion of the three-dimensional terrain or an identifier for a pre-defined terrain pattern included in the second data structure for storing in the entry, and
storing the first data structure and the second data structure in a database.

24. The navigation system of claim 10, wherein, for each tile of the tiling, the entry corresponding to the tile is generated to include an identifier for a pre-defined terrain pattern included in the second data structure when relative lateral coordinates of all vertices located on the tile correspond to relative lateral coordinates of vertices in the pre-defined terrain pattern, and wherein, for each tile of the tiling, the entry corresponding to the tile is generated to include vertex coordinates when relative lateral coordinates of all vertices located on the tile are different from relative lateral coordinates of vertices in the pre-defined terrain pattern.

25. The method of claim 22, wherein, for each tile of the tiling, the entry corresponding to the tile is generated to include an identifier for a pre-defined terrain pattern included in the second data structure when relative lateral coordinates of all vertices located on the tile correspond to relative lateral coordinates of vertices in the pre-defined terrain pattern, and wherein, for each tile of the tiling, the entry corresponding to the tile is generated to include vertex coordinates when relative lateral coordinates of all vertices located on the tile are different from relative lateral coordinates of vertices in the pre-defined terrain pattern.

26. The non-transitory computer readable storage medium of claim 23, wherein, for each tile of the tiling, the entry corresponding to the tile is generated to include an identifier for a pre-defined terrain pattern included in the second data structure when relative lateral coordinates of all vertices located on the tile correspond to relative lateral coordinates of vertices in the pre-defined terrain pattern, and wherein, for each tile of the tiling, the entry corresponding to the tile is generated to include vertex coordinates when relative lateral coordinates of all vertices located on the tile are different from relative lateral coordinates of vertices in the pre-defined terrain pattern.

27. The method of claim 1, where each pre-defined terrain pattern contained in the second plurality of tiles includes one or more vertices defining a topology of a surface mesh.

28. The method of claim 1, where the second data structure includes a second plurality of tiles, and each tile included in the second plurality of tiles contains a different pre-defined terrain pattern.

* * * * *